United States Patent
Abou-Nassif et al.

(10) Patent No.: US 10,896,480 B1
(45) Date of Patent: Jan. 19, 2021

(54) VISUALIZATION RENDERING USING AN EXTENSIBLE RENDERING SEQUENCE

(71) Applicant: International Business Machines Corporation, Armonk, NY (US)

(72) Inventors: Rami Abou-Nassif, Ottawa (CA); Donald Mark Allen, Manotick (CA); Wonsuk Yoo, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/579,528

(22) Filed: Sep. 23, 2019

(51) Int. Cl.
*G06T 11/20* (2006.01)
*G06T 1/20* (2006.01)
*G06F 9/52* (2006.01)

(52) U.S. Cl.
CPC .............. *G06T 1/20* (2013.01); *G06F 9/52* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 8,669,994 B2 | 3/2014 | Cardno et al. | |
| 8,935,671 B2* | 1/2015 | Sowerby | G06F 11/3624 717/125 |
| 9,336,555 B1* | 5/2016 | Guy | G06T 1/20 |
| 9,778,953 B2* | 10/2017 | Aiken | H04L 63/10 |
| 2007/0061752 A1* | 3/2007 | Cory | G06F 9/543 715/804 |
| 2007/0126736 A1* | 6/2007 | Tolle | G06T 11/001 345/440 |
| 2010/0289804 A1 | 11/2010 | Jackman et al. | |
| 2013/0342561 A1 | 12/2013 | Cardno et al. | |
| 2014/0282176 A1 | 9/2014 | Peacock et al. | |
| 2015/0213840 A1* | 7/2015 | Innami | G11B 27/34 386/243 |
| 2016/0092204 A1* | 3/2016 | Katkere | G06F 9/44526 717/170 |
| 2016/0110167 A1* | 4/2016 | Broadbent | G06T 11/00 717/117 |
| 2017/0161926 A1 | 6/2017 | Shetty et al. | |

(Continued)

FOREIGN PATENT DOCUMENTS

WO    WO2016061159 A1    4/2016

OTHER PUBLICATIONS

NWamba, "Realtime Data Visualization using Next.JS and Chart. JS," Pusher LTD, copyright 2018, access Sep. 25, 2018, 19 pages. https://pusher.com/tutorials/realtime-data-visualization-nextjs.

(Continued)

*Primary Examiner* — Joni Hsu
(74) *Attorney, Agent, or Firm* — Yee & Associates, P.C.

(57) ABSTRACT

A computer-implemented method, system, and computer program product for rendering a visualization. A computer program executes steps in a rendering sequence to render a visualization for a host application. The steps comprise default steps. The computer program is configured to include additional steps provided by the host application in the steps of the rendering sequence to include a host application visualization feature in the visualization. The visualization is displayed on a display device.

17 Claims, 9 Drawing Sheets

(56) References Cited

U.S. PATENT DOCUMENTS

2018/0349516 A1* 12/2018 Dutta .................... G06F 3/0481

OTHER PUBLICATIONS

Troche, "The Task Pattern: A Design Pattern for Processing and Monitoring Long-Running Tasks," developer.*, A Web Magazine for Software Developers, copyright 2003, 10 pages. https://www.developerdotstar.com/mag/articles/troche_taskpattern.html, Jun. 2004.

* cited by examiner

VISUALIZATION RENDERING USING AN EXTENSIBLE RENDERING SEQUENCE

BACKGROUND

1. Field

The disclosure relates generally to rendering and displaying a visualization of data. More particularly, illustrative embodiments relate to a computer implemented method, a system, and a computer program product for rendering a visualization using an extensible rendering sequence.

2. Description of the Related Art

Analytics is the discovery, interpretation, and communication of meaningful patterns in data; and the process of applying those patterns towards effective decision making. For example, organizations may apply analytics to business data to describe, predict, and improve business performance.

Data visualization refers to the techniques used to communicate data or information by encoding it as visual objects contained in graphics. Rendering a data visualization for display in a business analytics application, for example, may involve various steps. For example, one step may be to load the rendering code for generating a visualization of data. Another step may be to fetch the data that is to be visualized. A last step may be the actual rendering of the visualization of the data by running the rendering code.

Some of the steps for rendering a visualization of data may be computationally expensive. Also, some rendering steps may depend on other steps. Independent rendering steps that do not depend on other rendering steps may be run simultaneously. A dependent rendering step that depends on one or more other rendering steps may be blocked until all of the dependencies of the dependent rendering step are met.

Task execution techniques exist in various domains using various technologies. Patterns for implementing such solutions exist in the industry. However, simply solving the problem of executing and coordinating task executions using known techniques may not overcome the limitations of current systems and methods for rendering visualizations of data.

Therefore, it would be desirable to have a method and apparatus that take into account at least some of the issues discussed above, as well as other possible issues. For example, it would be desirable to have a method and apparatus that overcome technical problems with rendering visualizations of data.

SUMMARY

According to illustrative embodiments, a computer-implemented method of rendering a visualization is provided. A computer program executes steps in a rendering sequence to render a visualization for a host application. The steps comprise default steps. The computer program is configured to include additional steps provided by the host application in the steps of the rendering sequence to include a host application visualization feature in the visualization. The visualization is displayed on a display device.

According to illustrative embodiments, a system for rendering a visualization is provided. A data processing system is configured to execute steps in a rendering sequence by a computer program to render the visualization for a host application and to display the visualization on a display device. The steps comprise default steps. The computer program is configured to include additional steps provided by the host application in the steps of the rendering sequence to include a host application visualization feature in the visualization.

According to illustrative embodiments, a computer program product for rendering a visualization is provided. The computer program product comprises a computer readable storage medium having program instructions embodied therewith. The program instructions are executable by a device to cause the device to execute steps in a rendering sequence by a computer program to render the visualization for a host application and to display the visualization on a display device. The steps comprise default steps. The computer program is configured to include additional steps provided by the host application in the steps of the rendering sequence to include a host application visualization feature in the visualization.

Other variations are possible, as described below.

DETAILED DESCRIPTION

Figure 1:
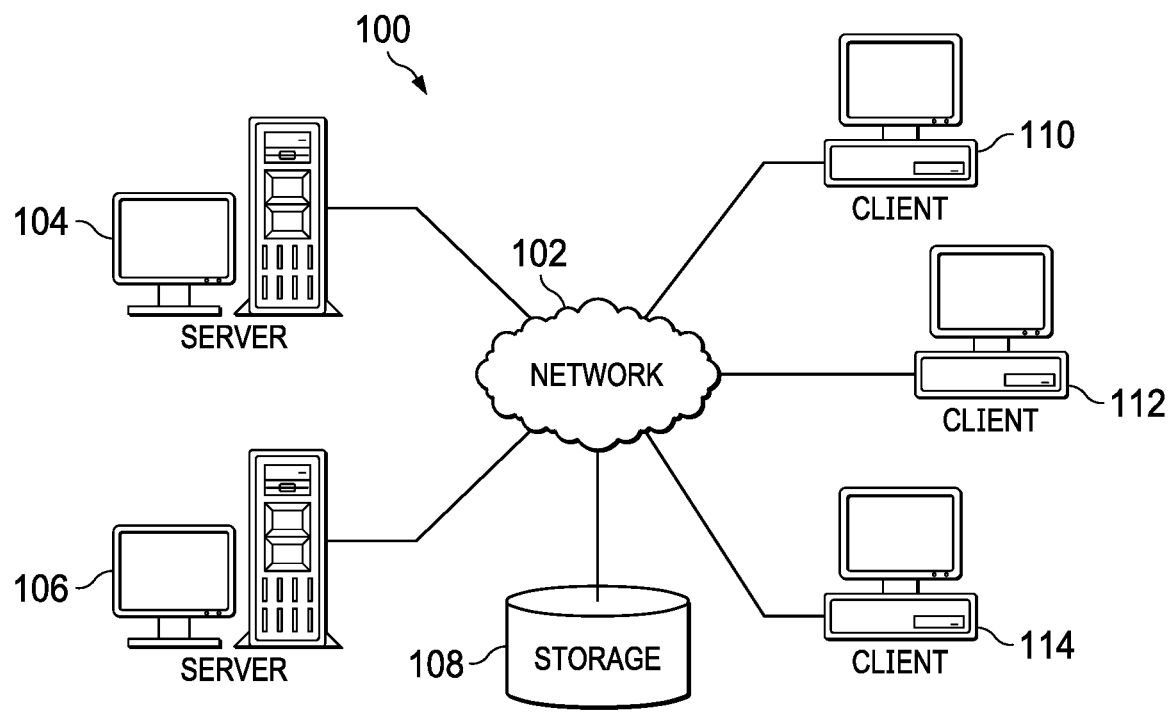
FIG. 1 is a pictorial representation of a network of data processing systems in which illustrative embodiments may be implemented.

The illustrative embodiments recognize and take into account that, although some of the steps for rendering a visualization of data may be computationally expensive to run, such steps may not need to re-execute with every rendering. Illustrative embodiments recognize and take into account that a rendering sequence may be used to manage what is required to run to generate a particular visualization and what can be skipped depending on the context of the execution.

Illustrative embodiments also recognize and take into account that it may be desirable for a host application, such as a dashboard or storytelling application, to customize the rendering of a visualization or to add certain features to the visualization. For example, rendering an additional layer on top of a visualization might require a step to fetch some additional data and another step to render the additional layer. Another example is when a host application requires additional summaries or data statistics, this would be a step that depends on the data fetching step. Illustrative embodiments recognize and take into account that an extensible solution is desirable that allows a host application to extend rendering with additional steps without access to the visualization rendering code or the default rendering sequence.

Illustrative embodiments provide a pluggable system that understands the context of the execution of a data visualization and its ability to decide what needs to run and what can be skipped or reused from previous executions. Illustrative embodiments provide a managed extensible process of rendering a visualization that defines a pluggable interface for defining execution steps. In accordance with an illustrative embodiment, the decision whether to execute a step or not is prescribed by the step plugin but managed by the overall rendering sequence. The ability to skip certain rendering steps depending on the context of the rendering provides a good and performant data visualization rendering.

Illustrative embodiments provide an extensible visualization rendering sequence that is used to achieve the execution of the various steps and tasks to complete the rendering of a visualization in a data visualization application, such as a dashboard. A rendering sequence in accordance with an illustrative embodiment may control the execution of steps that may include the loading of rendering code, the execution of data queries, and the rendering of a visualization on a display screen. A rendering sequence in accordance with an illustrative embodiment may control the execution of steps for post processing of the data, for fetching additional data analytics that may be used to render decorations on the visualization, and for performing other appropriate functions for rendering a visualization of data.

Illustrative embodiments provide a declarative interface for hosting applications, such as a dashboard or data science application, that is using the visualization component. Illustrative embodiments provide a visualization application programming interface that allows the host application to customize the execution steps and add features to visualizations that are specific to the host application. For example, an exploration or data analysis tool might render additional decorations on top of a visualization to show various correlations within the data used in the visualization. Another application might extract the data and compute various statistical analysis related to the data being visualization.

In accordance with an illustrative embodiment, a rendering sequence declarative specification describes the steps to be executed, their dependencies, and when they are required to be re-executed depending on the execution context. For example, a data fetch task might not need to re-execute if a previously rendered visualization is merely being resized. As another example, the full rendering task might not be needed if existing data points are simply being highlighted or selected. In this example, only a data point highlighting step may be run.

In accordance with an illustrative embodiment, various execution contexts may be defined within a rendering sequence. New execution contexts may also be contributed by a host application. An example of an execution context is "data filtering", which occurs when the data to be visualized is being filtered. This context requires the data fetch task to be executed. In contrast, another context like "resize" might not require running the data fetch task. In accordance with an illustrative embodiment, the rendering sequence will manage which tasks will be executed in parallel, which tasks will be blocked, and which tasks will be skipped depending on the defined dependencies and the context requirement.

Illustrative embodiments provide an improvement to the overall process for rendering a visualization, from initialization, to data point selection, to the rendering of the visualization. Illustrative embodiments are not limited to any specific type or types of visualizations. Illustrative embodiments may be used to render any appropriate type of visualization.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computer 110, client computer 112, and client computer 114 connect to network 102. Client computers 110, 112, and 114 can be, for example, computers, workstations, or network computers. In the depicted example, server computer 104 provides information, such as boot files, operating system images, and applications to client computers 110, 112, and 114. In this illustrative example, server computer 104, server computer 106, storage unit 108, and client computers 110, 112, and 114 are network devices that connect to network 102 in which network 102 is the communications media for these network devices.

Client computers 110, 112, and 114 are clients to server computer 104 in this example. Network data processing system 100 may include additional server computers, client computers, and other devices not shown. Client computers 110, 112, and 114 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client computers 110, 112, or 114 over network 102 for use on client devices 110, 112, or 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
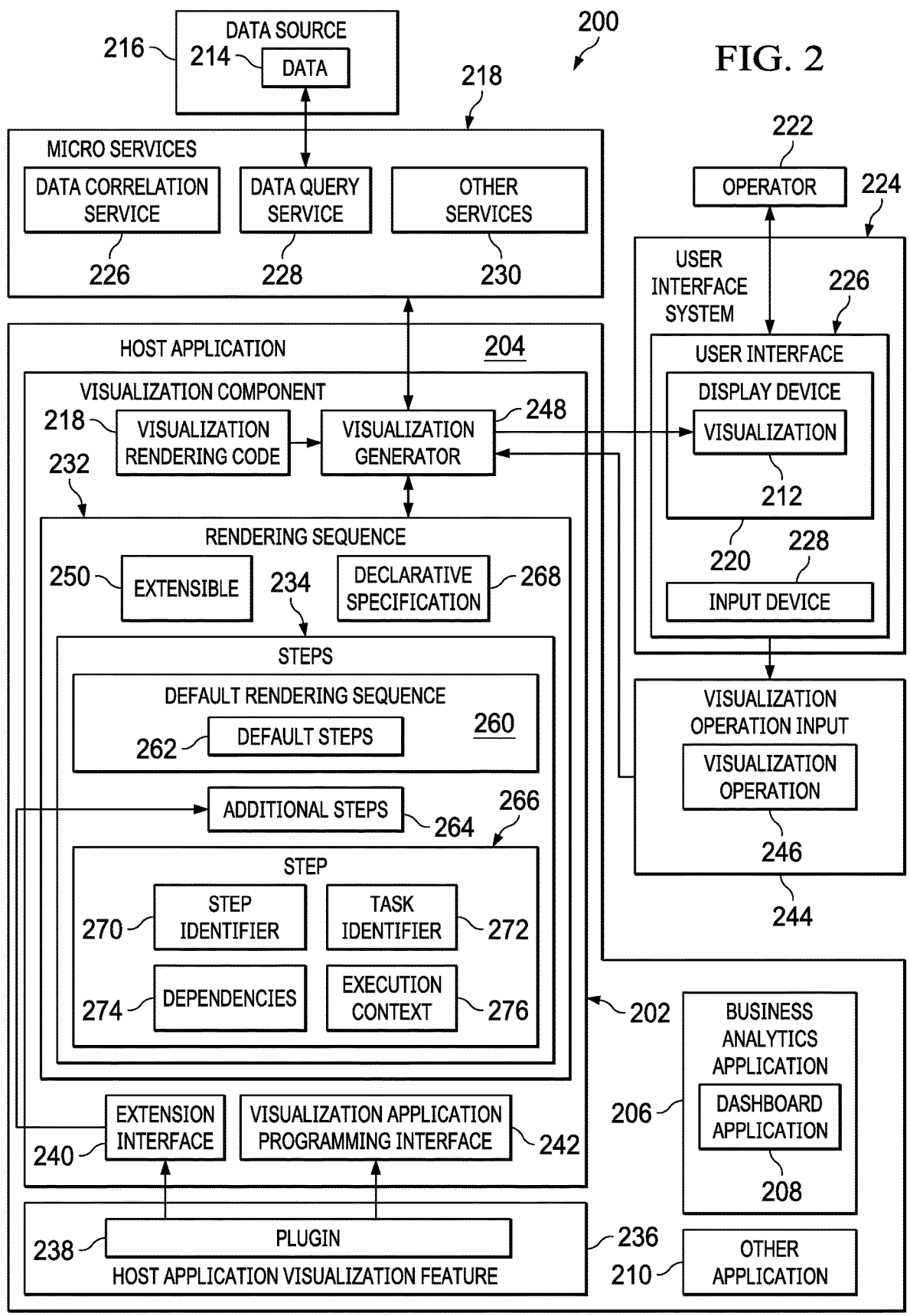
FIG. 2 is a block diagram of a visualization rendering system in accordance with an illustrative embodiment.

With reference to FIG. 2, a block diagram of a visualization rendering system is depicted in accordance with an illustrative embodiment. In this illustrative example, visualization rendering system 200 includes components that may be implemented in hardware such as the hardware shown in network data processing system 100 in FIG. 1.

Visualization rendering system 200 may be implemented in software, hardware, firmware or a combination thereof. When software is used, the operations performed by visualization rendering system 200 may be implemented in program code configured to run on hardware, such as a processor unit. When firmware is used, the operations performed by visualization rendering system 200 may be implemented in program code and data and stored in persistent memory to run on a processor unit. When hardware is employed, the hardware may include circuits that operate to perform the operations in visualization rendering system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In accordance with an illustrative embodiment, visualization rendering system 200 includes visualization component 202. Visualization component 202 provides a data visualization capability for host application 204. Host application 204 may be any application for which the visualization of data is necessary or desirable. For example, without limitation, host application 204 may comprise business analytics application 206, such as dashboard application 208, or other application 210. Dashboard application 208 may comprise an information management tool that visually tracks, analyzes and displays key performance indicators (KPI), metrics and key data points to monitor the health of a business, department or specific process. Dashboard application 208 may be referred to as a data dashboard. Other application 210 may be, for example, a storytelling application, a data analysis tool, or any other appropriate application using data visualization.

Visualization component 202 may be configured to render visualization 212 of data 214 for host application 204. Data 214 may comprise any appropriate type of data or combination of different types of data from any appropriate data source 216. For example, without limitation, data 214 may comprise live data, recorded data, or both live and recorded data. Data 214 may be received from data source 216 in any appropriate data format. Data source 216 may comprise a single data source or multiple data sources. Data source 216 may be a local data source or a remote data source with respect to host application 204.

Visualization 212 may comprise any appropriate graphical representation of data 214. For example, without limitation, visualization 212 may comprise a bar chart, a scatter plot, another appropriate graphical representation of data 214, or various combinations of graphical representations of data 214.

For example, without limitation, visualization component 202 may include visualization rendering code 218 for rendering various different visualizations of various different types of data 214. Visualization rendering code 218 may comprise program code that is executed by visualization component 202 to render visualization 212. Visualization component 202 may be configured to select and execute the appropriate visualization rendering code 218 to render a desired visualization 212 for host application 204. Visualization rendering code 218 also may be referred to as a visualization bundle.

Visualization 212 may be rendered in an appropriate manner and provided by visualization component 202 for display on display device 220. Display device 220 may comprise any appropriate device for displaying visualization 212 for viewing by operator 222. For example, without limitation, display device 220 may be configured to display graphics on a display screen at a desired level of resolution for displaying visualization 212 to operator 222. Operator 222 may be a human operator of host application 204.

Display device 220 may be part of user interface system 224 on which user interface 226 for host application 204 may be implemented. User interface 226 may comprise a graphical user interface whereby operator 222 interacts with host application 204. For example, without limitation, visualization 212 may comprise part of user interface 226 such that operator 222 may interact with user interface 226.

User interface system 224 may include input device 228. Input device 228 may include any appropriate device whereby operator 222 may provide input to user interface 226. For example, without limitation, input device 228 may comprise a mouse or other pointing device. In another example, display device 220 and input device 228 may be combined in a single device, such as a touch screen display.

In accordance with an illustrative embodiment, visualization component 202 comprises a computer program that renders visualization 212 by executing rendering sequence 232. For example, visualization component 202 may comprise visualization generator 248 that executed visualization rendering code 218 to render visualization 212. In accordance with an illustrative embodiment, visualization component 202 uses rendering sequence 232 to coordinate steps 234 needed to fetch data, to render visualization 212 on display device 220, as well as any number of other customizable additional steps 264.

In accordance with an illustrative embodiment, rendering sequence 232 comprises declarative specification 268 that defines steps 234 that are executed to render visualization 212. For example, step 266 in steps 234 may be defined by step identifier 270, task identifier 272, dependencies 274, and execution context 276. Step identifier 270 may comprise any appropriate alphanumeric or other identifier that uniquely identifies step 266. Task identifier 272 identifies a task to be performed when step 266 is executed. For example, without limitation, task identifier 272 may identify the location of program code which may executed to perform the task. Dependencies 274 identify one or more other ones of steps 234 that must be executed before step 266 is executed. Dependencies 274 may be identified by indicating the step identifier of another one of steps 234. Execution context 276 identifies conditions during execution of the rendering sequence for which re-execution of the step is required or not required.

Rendering sequence 232 may comprise default rendering sequence 260 comprising default steps 262. Default rendering sequence 260 for rendering visualization 212 may be provided by visualization component 202.

In accordance with an illustrative embodiment, rendering sequence 232 may be extensible 250. In accordance with an illustrative embodiment, host application 202 can inject additional steps 264 into rendering sequence 232 that will be used when rendering visualization 212. For example, without limitation, host application 204 can add host application visualization feature 236 to visualization 212 by providing additional steps 264 that define the extra rendering steps that the feature requires through plugin 238.

Host application 204 may use extension interface 240 provided by visualization component 202. Extension interface 240 may be configured to make additional steps 264 available to rendering sequence 232.

In accordance with an illustrative embodiment, step 266 may execute some asynchronous code and may use visualization application programming interface 242 to interact with visualization 212 and other existing steps 234. Host application 204 plugin 238 interact with visualization 212 and other steps 234 using visualization application programming interface 242 that gives access to the model of visualization 212 as well as actions that could be performed on visualization 212 (e.g. getData, getFilters, setDecoration, etc.).

Steps 234 of rendering sequence 232 may communicate asynchronously with back-end micro services 280, such as data correlation service 282, data query service 284, and other services 286. Steps 234 of rendering sequence 232 also may interact with user interface 226 in case some additional rendering is required.

For example, visualization component 202 may receive visualization operation input 244 from user interface 226. Visualization operation input 244 may define visualization operation 246 to be performed. For example, without limitation, visualization operation 246 may comprise a desired change to visualization 212 that is being rendered or is already rendered. In accordance with an illustrative embodiment, visualization component 202 may implement visualization operation 246 without re-executing an entire rendering sequence 232.

The illustration of visualization rendering system 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
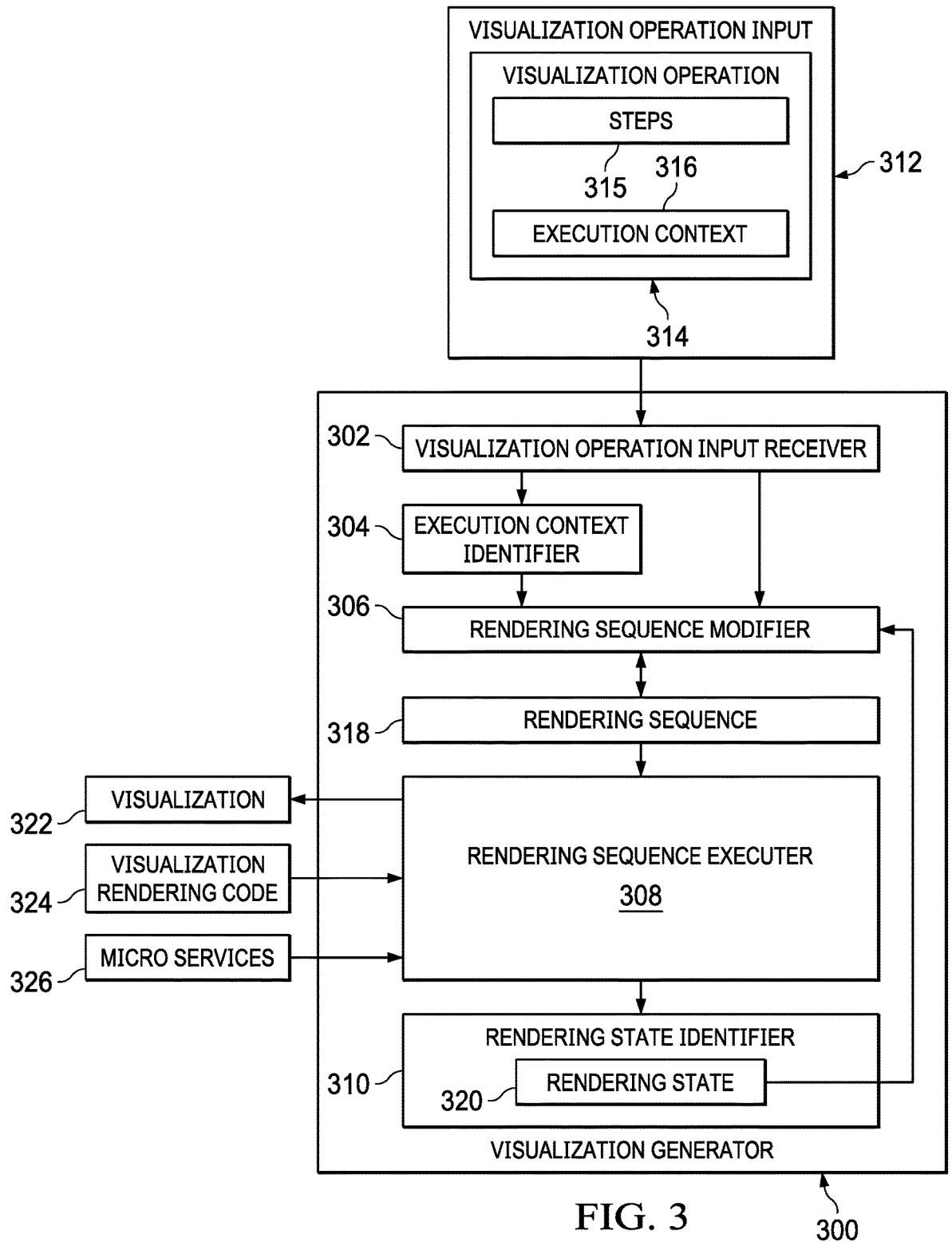
FIG. 3 is a block diagram of a visualization generator in accordance with an illustrative embodiment.

With reference to FIG. 3, a block diagram of a visualization generator is depicted in accordance with an illustrative embodiment. Visualization generator 300 is an example of one implementation of visualization generator 248 in visualization component 202 in FIG. 2. Visualization generator 300 includes visualization operation input receiver 302, execution context identifier 304, rendering sequence modifier 306, rendering sequence executer 308, and rendering state identifier 310.

Visualization operation input receiver 302 is configured to receive visualization operation input 312. For example, visualization operation input 312 may be received from a user interface of a host application. Visualization operation input 312 may define visualization operation 314 to be performed. For example, without limitation, visualization operation 314 may be a change to an already rendered visualization or to a visualization that is in the process of being rendered. Visualization operation 314 may be defined by steps 315 that are performed to implement visualization operation 314 and execution context 316. In accordance with an illustrative embodiment, execution context 316 is used to identify steps of a rendering sequence that is already executed or that is being executed that are required to be executed or re-executed to implement visualization operation 314.

Execution context identifier 304 identifies execution context 316 of visualization operation 314. The identified execution context 316 of visualization operation 314 along with steps 315 for visualization operation 314 may be provided to rendering sequence modifier 306.

Rendering sequence executer 308 executes rendering sequence 318 to render visualization 322. For example, rendering sequence executer 308 may execute the various steps of rendering sequence 318 to retrieve and run visualization rendering code 324 to render visualization 322. Some of the steps of rendering sequence 318 may use micro services 326 to obtain information for rendering visualization 322.

Rendering state identifier 310 identifies rendering state 320 of the execution of rendering sequence 318 by rendering sequence executer 308. For example, without limitation, rendering state 320 may indicate steps of rendering sequence 318 that have been executed, the results of any steps of rendering sequence 318 that have been executed, and steps of rendering sequence 318 that have not been executed. Rendering state 320 is also provided as an input to rendering sequence modifier 306.

Rendering sequence modifier 306 is configured to modify rendering sequence 318 to implement visualization operation 314 based on execution context 316 and rendering state 320. An example of a method that may be used by rendering sequence modifier 306 is described below with reference to FIG. 9. After rendering sequence 318 is modified by rendering sequence modifier 306, the modified rendering sequence 318 may be executed by rendering sequence executer 308 to implement visualization operation 314 in rendering visualization 322.

Figure 4:
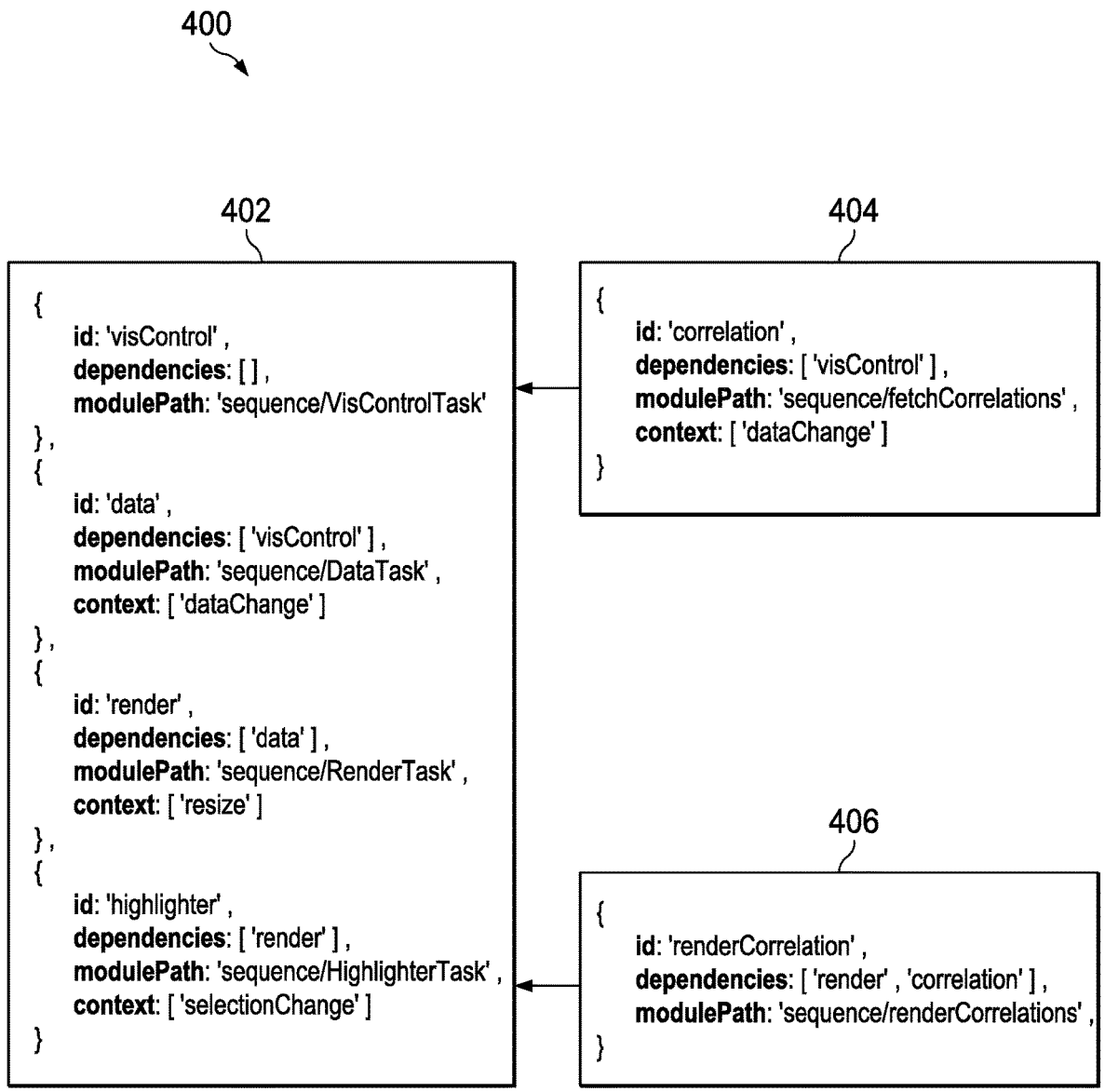
FIG. 4 is an illustration of an example of a declarative specification rendering sequence in accordance with an illustrative embodiment.

With reference to FIG. 4, an illustration of an example of a declarative specification rendering sequence is depicted in accordance with an illustrative embodiment. Rendering sequence 400 is an example of one implementation of rendering sequence 232 in FIG. 2.

Rendering sequence 400 includes default rendering sequence 402 and additional steps 404 and 406. Additional steps 404 and 406 are extensions that may extend the rendering with additional execution steps by a host application. In this example, additional steps 404 and 406 add data correlation decorations to a visualization.

For example, additional step 404 is a step that fetches a data correlation. This step can be executed at the same time as a data query. This step is required to be run when data changes.

Additional step 406 is a step that renders decorations used to highlight the data correlation. This step depends on the correlation fetch task and the render task.

Figure 5:
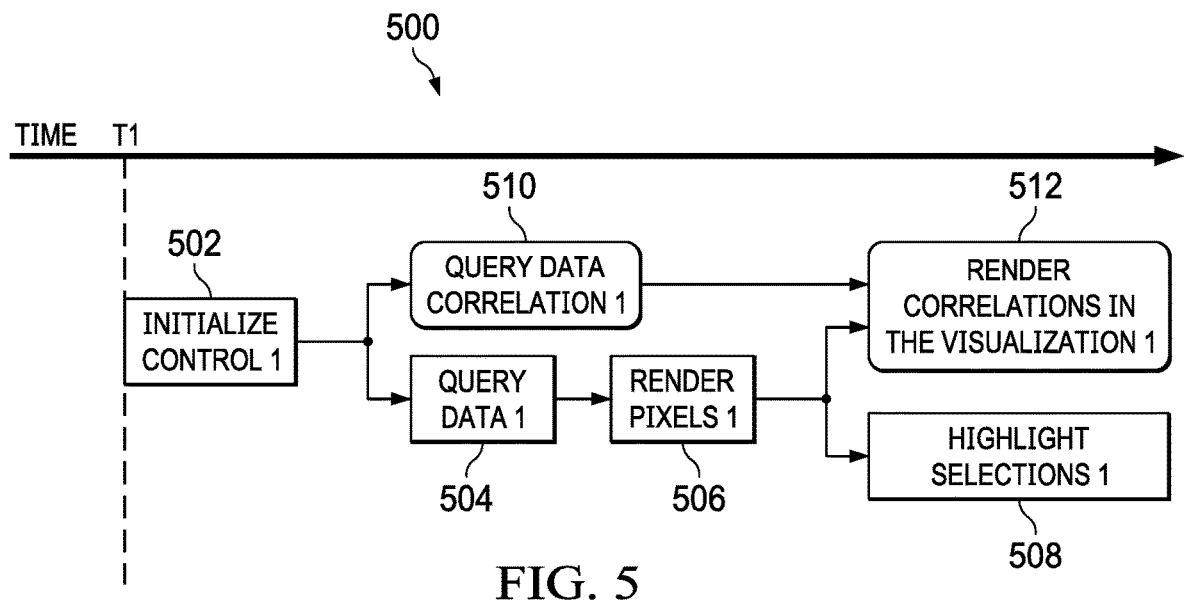
FIG. 5 is an illustration of an example of a rendering sequence in accordance with an illustrative embodiment.

With reference to FIG. 5, an illustration of an example of a rendering sequence is depicted in accordance with an illustrative embodiment. Rendering sequence 500 is an example of rendering sequence 232 in FIG. 2.

Rendering sequence 500 is for rendering a visualization that requires the following default steps to render: initialize the control 1 502, query data 1 504, render pixels 1 506, and highlight selections 1 508. Rendering sequence 500 further includes a visualization extension for data correlations that contributes the following additional steps to be part of the execution of the visualization: query data correlation 1 510 and render correlations in the visualization 1 512.

In this example, execution of rendering sequence 500 begins at time T1. The initial rendering of the visualization thus begins before any user interactions in this example.

Figure 6:
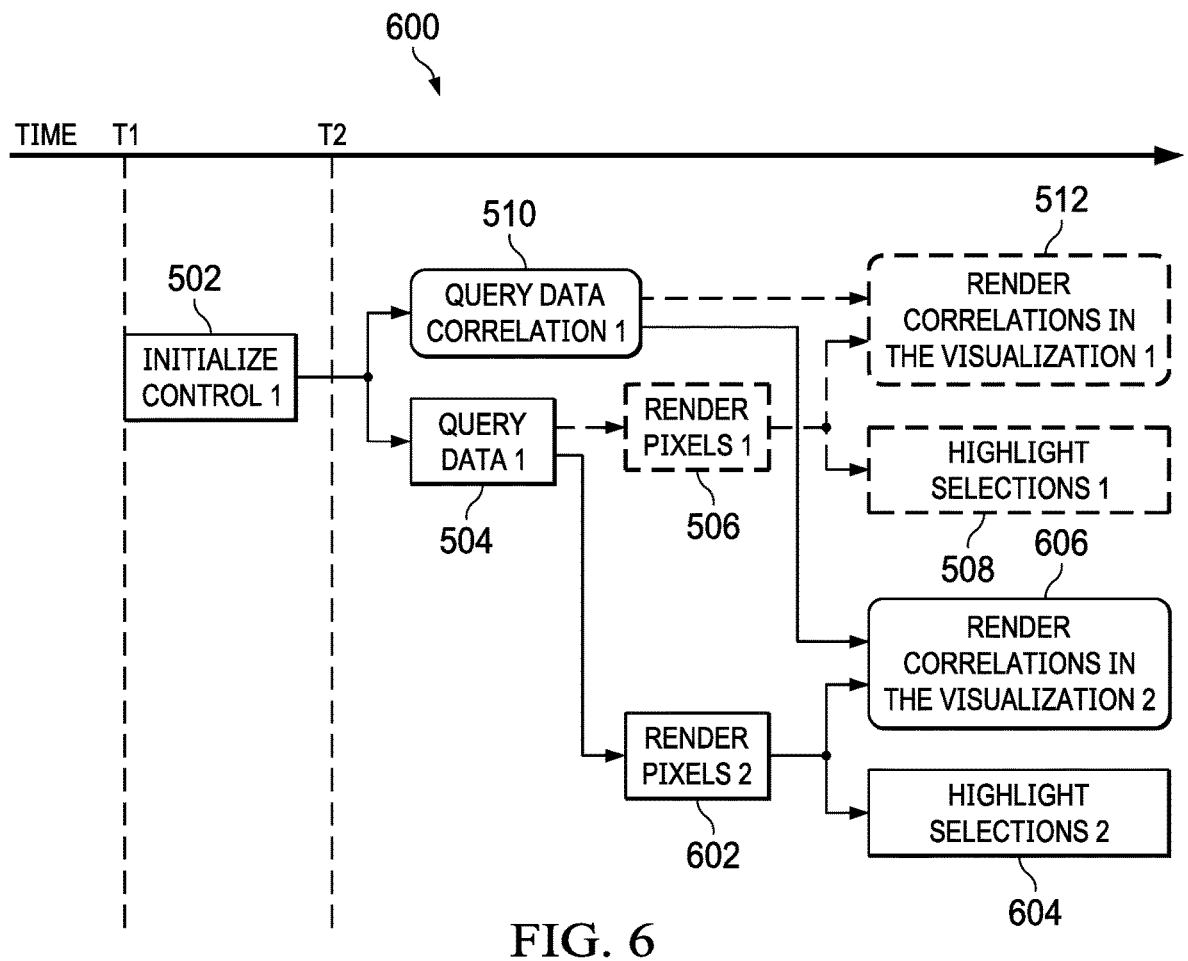
FIG. 6 is an illustration of a modified rendering sequence in accordance with an illustrative embodiment.

Turning to FIG. 6 an illustration of a modified rendering sequence is depicted in accordance with an illustrative embodiment. Rendering sequence 600 is a modification of rendering sequence 500 in FIG. 5 in response to receiving a visualization operation input to change the visualization being generated by rendering sequence 500.

As the initial rendering is executing, the user decides to resize the visualization at time T2. The new execution in the context of a resize does not require any changes to the initialize control 1 502, query data 1 504, and query data correlation 1 510 steps. However, the following steps from rendering sequence 500 are marked as invalid and won't be executed: render pixels 1 506, highlight selections 1 508, and render correlations in the visualization 1 512. The following steps will be executed in place of the invalid steps because they are required by the latest execution with the resize of the visualization: render pixels 2 602, highlight selections 2 604, and render correlations in the visualization 2 606.

Figure 7:
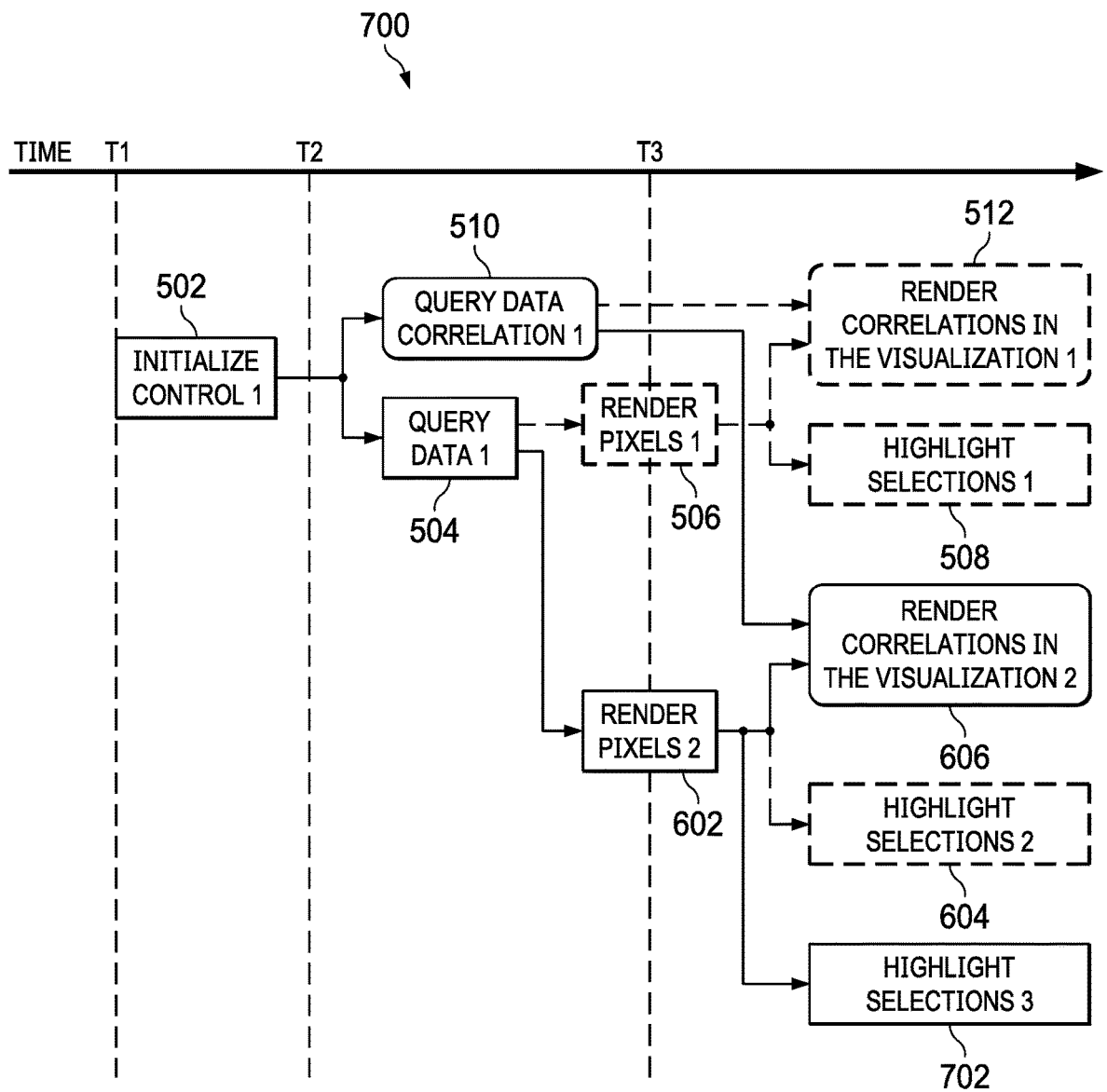
FIG. 7 is an illustration of a further modified rendering sequence in accordance with an illustrative embodiment.

Turning to FIG. 7 an illustration of a further modified rendering sequence is depicted in accordance with an illustrative embodiment. Rendering sequence 700 is a modification of rendering sequence 600 in FIG. 6 in response to receiving a visualization operation input to change the visualization being generated by rendering sequence 600.

In this example, at time T3, as the last resize is being executed, a data selection change occurs in the visualization. The new execution in the context of a datapoint selection change does not require changes to the following steps in rendering sequence 600: initialize control 1 502, query data 1 504, query data correlation 1 510, render pixels 2 602, and render correlations in the visualization 2 606. One step of the previous rendering sequence 600 is marked as invalid and will not be executed: highlight selections 2 604. This invalid step is replaced with step highlight selections 3 702 in modified rendering sequence 700.

Figure 8:
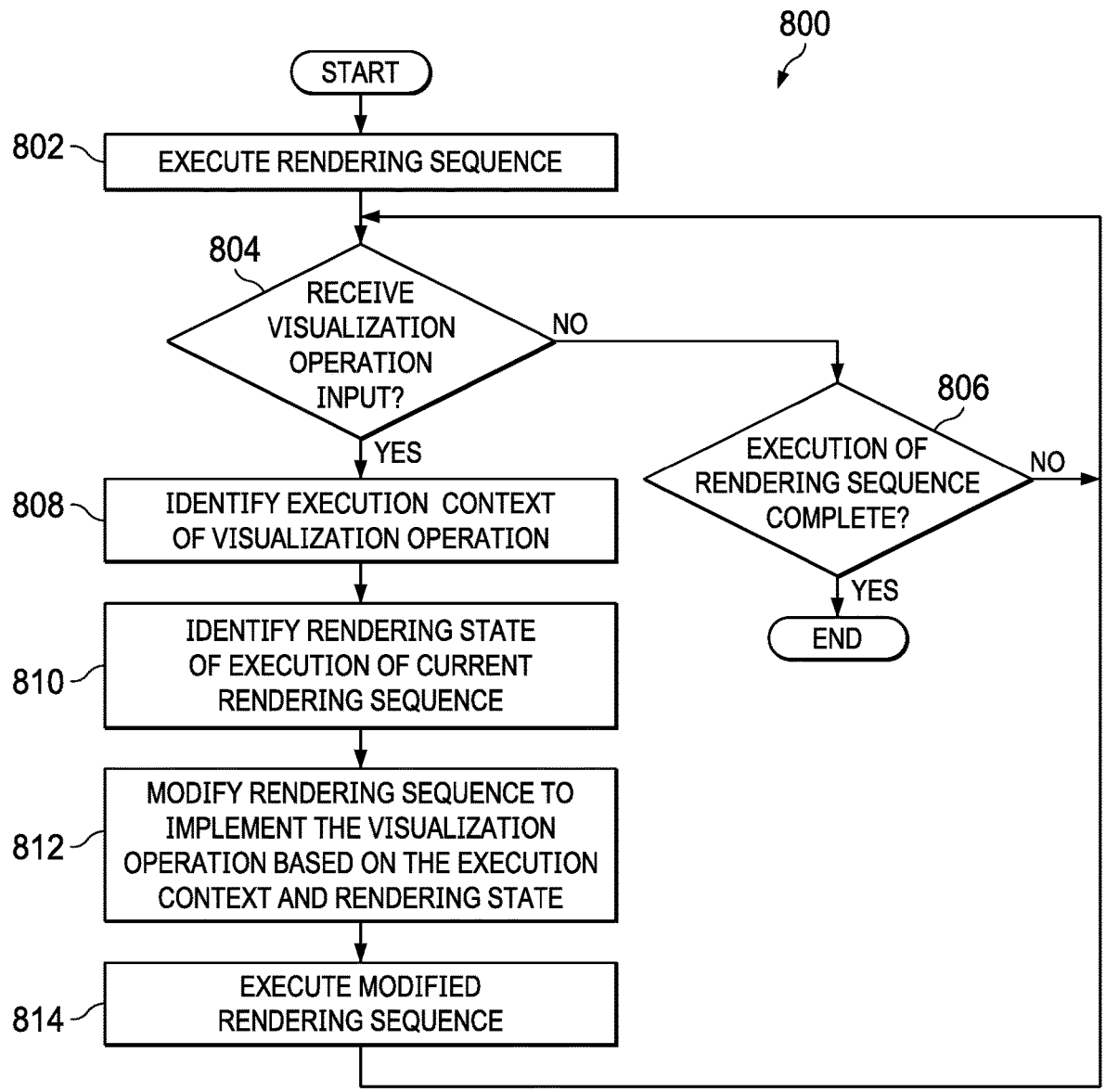
FIG. 8 is an illustration of a flowchart of a process for rendering a visualization in accordance with an illustrative embodiment.

Turning to FIG. 8, an illustration of a flowchart of a process for rendering a visualization is depicted in accordance with an illustrative embodiment. Process 800 may be implemented in visualization component 202 in visualization rendering system 200 in FIG. 2. Process 800 in may be implemented in hardware, software, or both. When implemented in software, the process may take the form of program code that is run by one or more processor units located in one or more hardware devices in one or more computer systems.

Process 800 may begin with executing a rendering sequence (operation 802). While the rendering sequence is being executed, it may be determined whether a visualization operation input is received (operation 804). In response to receiving a visualization operation input, the execution context of the visualization operation is identified (operation 808). The rendering state of execution of the current rendering sequence also is identified (operation 810). The rendering sequence then is modified to implement the visualization operation based on the execution context and the rendering state (operation 812). The modified rendering sequence then is executed (operation 814). Process 800 then returns to operation 804 to determine whether another visualization operation input is received while the modified rendering sequence is being executed.

In response to a determination at operation 804 that a visualization operation has not been received, it is determined whether the execution of the rendering sequence is complete (operation 806). In response to a determination at operation 806 that the execution of the rendering sequence is not complete, process 800 returns to operation 804 to determine whether a visualization operation input is received. In response to a determination at operation 806 that the execution of the rendering sequence is complete, process 800 may terminate.

Figure 9:
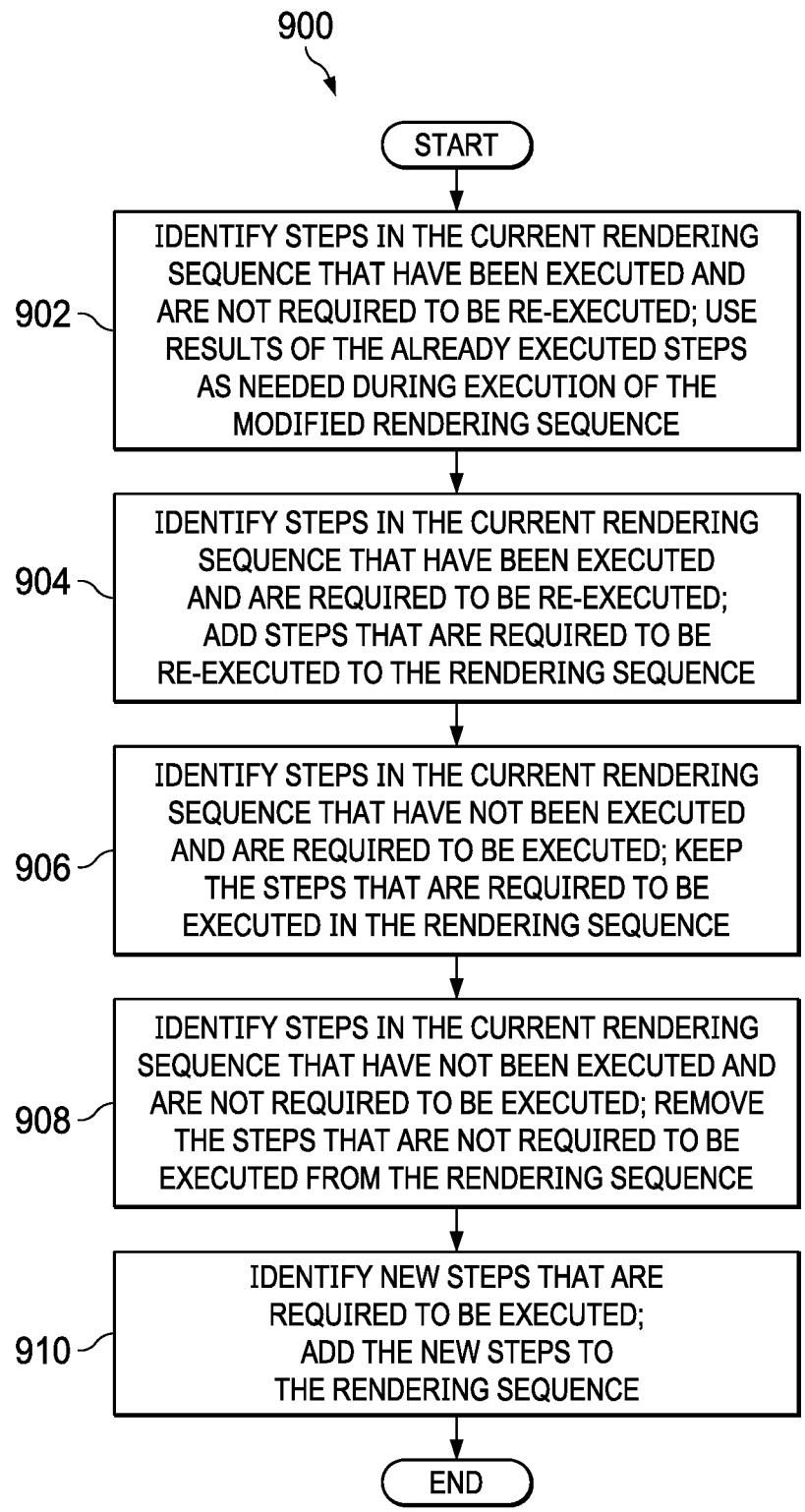
FIG. 9 is an illustration of a flowchart of a process for modifying a rendering sequence in response to an operator input to change a visualization in accordance with an illustrative embodiment.

Turning to FIG. 9, an illustration of a flowchart of a process for modifying a rendering sequence in response to an operator input to change a visualization is depicted in accordance with an illustrative embodiment. Process 900 is an example of one implementation of operation 812 in process 800 in FIG. 8. Process 900 may be implemented, for example, in rendering sequence modifier 306 in visualization generator 300 in FIG. 3. The operations of process 900 may be performed in an appropriate order that is different from the order of operations presented herein.

Process 900 may include identifying steps in a current rendering sequence that have been already executed, but that are not required to be re-executed; the results of any such already executed steps may be used as needed during execution of the modified rendering sequence (operation 902). Steps in the current rendering sequence that have already been executed and that are required to be re-executed may be identified; in this case, any steps that need to be re-executed may be added to the rendering sequence (operation 904). Steps in the current rendering sequence that have not been executed but that are required to be executed may be identified; such steps that are required to be executed may be retained in the rendering sequence (operation 906). Steps in the current rendering sequence that have not been executed and that are not required to be executed may be identified; such steps that are not required to be executed may be removed from the rendering sequence (operation 908). New steps that are not part of the current rendering sequence but that are required to be executed may be identified and added to the rendering sequence (operation 910), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
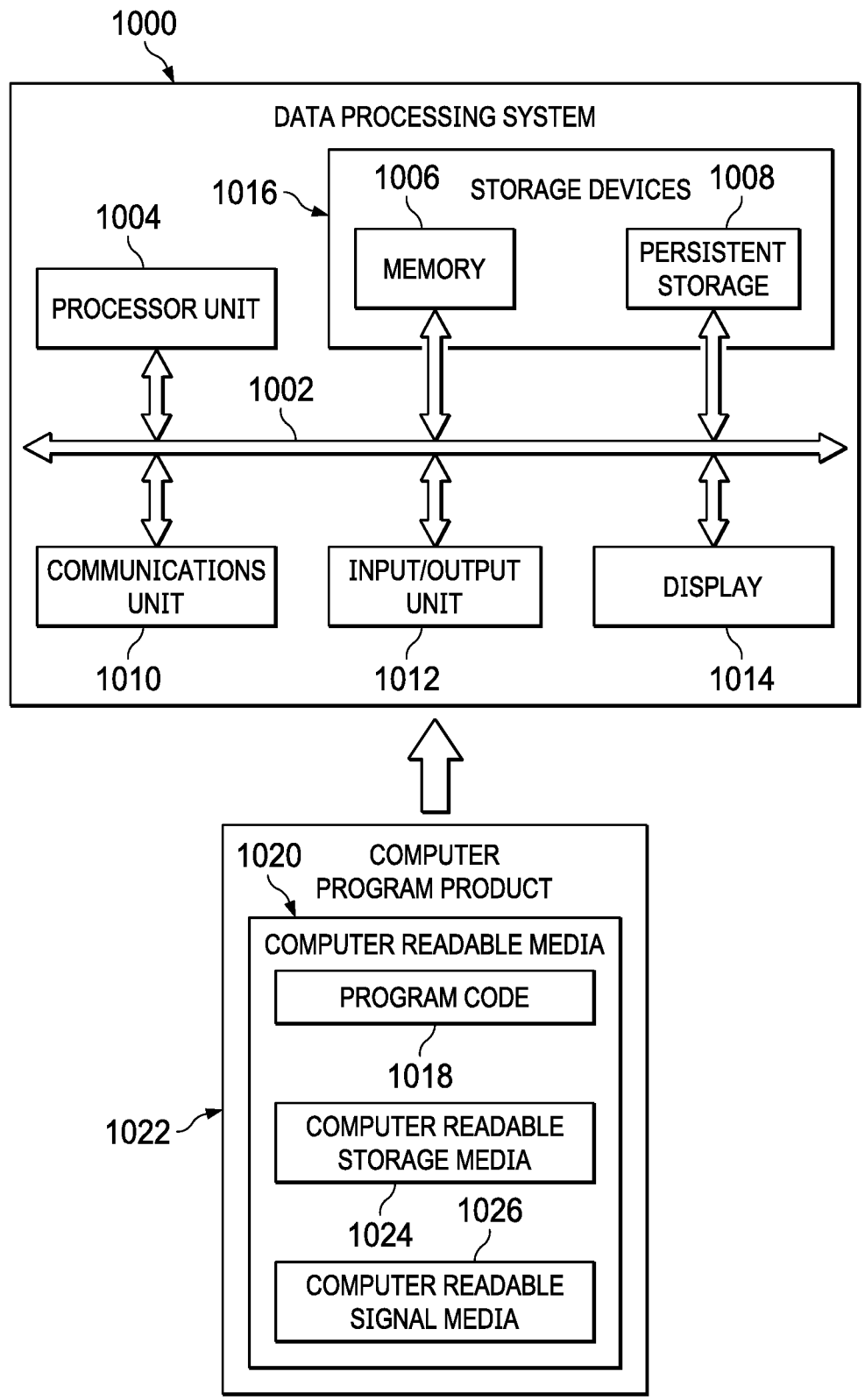
FIG. 10 is a block diagram of a data processing system in accordance with an illustrative embodiment.

Turning to FIG. 10, a block diagram of a data processing system is depicted in accordance with an illustrative embodiment. Data processing system 1000 can be used to implement server computer 104, server computer 106, client computer 110, client computer 112, and client computer 114 in FIG. 1. Data processing system 1000 can also be used to implement visualization rendering system 200 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of rendering a visualization, the computer-implemented method comprising:
    executing steps in a rendering sequence to render the visualization for a host application, wherein the rendering sequence includes default steps
    extending the rendering sequence by allowing the host application to inject additional steps provided by the host application into the rendering sequence that render data correlation decorations specific to the host application on top of the visualization showing correlations within data used in the visualization;
    displaying the visualization on a display device based on the default steps included in the rendering sequence and the additional steps injected by the host application into the rendering sequences;
    receiving a visualization operation input identifying a visualization operation to be performed;
    identifying an execution context of the visualization operation, wherein the execution context identifies steps of the rendering sequence that are required to be executed or re-executed;
    identifying a rendering state of execution of the rendering sequence, wherein the rendering state identifies steps of the rendering sequence that have been executed, results of the steps of the rendering sequence that have been executed, and any steps of the rendering sequence that have not been executed;
    modifying the rendering sequence to implement the visualization operation using the execution context of the visualization operation and the rendering state of the rendering sequence; and
    executing the rendering sequence after modifying the rendering sequence based on the execution context of the visualization operation and the rendering state of the rendering sequence.

2. The computer-implemented method of claim 1, wherein the steps of the rendering sequence also include the additional steps injected by the host application into the rendering sequence.

3. The computer-implemented method of claim 1, wherein the host application provides the additional steps that render the data correlation decorations on top of the visualization through a plugin.

4. The computer-implemented method of claim 1, wherein the steps of the rendering sequence are defined by a rendering sequence declarative specification.

5. The computer-implemented method of claim 1, wherein a step in the steps of the rendering sequence is defined by:
    a step identifier that identifies the step;
    a task identifier that identifies a task to be performed when the step is executed;
    dependencies that identify another step that must be executed before the step is executed; and
    an execution context that identifies conditions during execution of the rendering sequence for which re-execution of the step is required or not required.

6. The computer-implemented method of claim 1, wherein modifying the rendering sequence comprises:
    identifying steps in the rendering sequence that have been executed and that are not required to be re-executed;
    using results of the steps that are not required to be re-executed during the executing of the rendering sequence after modifying the rendering sequence;
    identifying steps in the rendering sequence that have been executed and are required to be re-executed;
    adding the steps that are required to be re-executed to the rendering sequence;
    identifying steps in the rendering sequence that have not been executed and are not required to be executed; and
    removing the steps that have not been executed and are not required to be executed from the rendering sequence.

7. A data processing system for rendering a visualization, the data processing system comprising:
    a bus system;
    a storage device connected to the bus system, wherein the storage device stores program instructions; and
    a processor connected to the bus system, wherein the processor executes the program instructions to:
        execute steps in a rendering sequence to render the visualization for a host application, wherein the rendering sequence includes default steps;
        extend the rendering sequence by allowing the host application to inject additional steps provided by the host application into the rendering sequence that render data correlation decorations specific to the host application on top of the visualization showing correlations within data used in the visualization;
        display the visualization on a display device based on the default steps included in the rendering sequence and the additional steps injected by the host application into the rendering sequence;
        receive a visualization operation input identifying a visualization operation to be performed;
        identify an execution context of the visualization operation, wherein the execution context identifies steps of the rendering sequence that are required to be executed or re-executed;
        identify a rendering state of execution of the rendering sequence, wherein the rendering state identifies steps of the rendering sequence that have been executed, results of the steps of the rendering sequence that have been executed, and any steps of the rendering sequence that have not been executed;
        modify the rendering sequence to implement the visualization operation using the execution context of the visualization operation and the rendering state of the rendering sequence; and
        execute the rendering sequence after modifying the rendering sequence based on the execution context of the visualization operation and the rendering state of the rendering sequence.

8. The data processing system of claim 7, wherein the steps of the rendering sequence also include the additional steps injected by the host application into the rendering sequence.

9. The data processing system of claim 7, wherein the host application provides the additional steps that render the data correlation decorations on top of the visualization through a plugin.

10. The data processing system of claim 7, wherein the steps of the rendering sequence are defined by a rendering sequence declarative specification.

11. The data processing system of claim 7, wherein a step in the steps of the rendering sequence is defined by:
- a step identifier that identifies the step;
- a task identifier that identifies a task to be performed when the step is executed;
- dependencies that identify another step that must be executed before the step is executed; and
- an execution context that identifies conditions during execution of the rendering sequence for which re-execution of the step is required or not required.

12. The data processing system of claim 7, wherein the processor further executes the program instructions to modify the rendering sequence by:
- identifying steps in the rendering sequence that have been executed and that are not required to be re-executed;
- using results of the steps that are not required to be re-executed during execution of the rendering sequence after the rendering sequence is modified;
- identifying steps in the rendering sequence that have been executed and are required to be re-executed;
- adding the steps that are required to be re-executed to the rendering sequence;
- identifying steps in the rendering sequence that have not been executed and are not required to be executed; and
- removing the steps that have not been executed and are not required to be executed from the rendering sequence.

13. A computer program product for rendering a visualization, the computer program product comprising a computer readable storage medium having program instructions embodied therewith, the program instructions executable by a data processing system to cause the data processing system to:
- execute steps in a rendering sequence to render the visualization for a host application, wherein the rendering sequence includes default steps;
- extend the rendering sequence by allowing the host application to inject additional steps provided by the host application into the rendering sequence that render data correlation decorations specific to the host application on top of the visualization showing correlations within data used in the visualization;
- display the visualization on a display device based on the default steps included in the rendering sequence and the additional steps injected by the host application into the rendering sequence;
- receive a visualization operation input identifying a visualization operation to be performed;
- identify an execution context of the visualization operation, wherein the execution context identifies steps of the rendering sequence that are required to be executed or re-executed;
- identify a rendering state of execution of the rendering sequence, wherein the rendering state identifies steps of the rendering sequence that have been executed, results of the steps of the rendering sequence that have been executed, and any steps of the rendering sequence that have not been executed;
- modify the rendering sequence to implement the visualization operation using the execution context of the visualization operation and the rendering state of the rendering sequence; and
- execute the rendering sequence after modifying the rendering sequence based on the execution context of the visualization operation and the rendering state of the rendering sequence.

14. The computer program product of claim 13, wherein the steps of the rendering sequence also include the additional steps injected by the host application into the rendering sequence.

15. The computer program product of claim 13, wherein the host application provides the additional steps that render the data correlation decorations on top of the visualization through a plugin.

16. The computer program product of claim 13, wherein the steps of the rendering sequence are defined by a rendering sequence declarative specification.

17. The computer program product of claim 13, wherein a step in the steps of the rendering sequence is defined by:
- a step identifier that identifies the step;
- a task identifier that identifies a task to be performed when the step is executed;
- dependencies that identify another step that must be executed before the step is executed; and
- an execution context that identifies conditions during execution of the rendering sequence for which re-execution of the step is required or not required.

\* \* \* \* \*